United States Patent [19]

Taylor

[11] Patent Number: 4,889,458
[45] Date of Patent: Dec. 26, 1989

[54] LOCK NUT ASSEMBLIES

[75] Inventor: Brian W. Taylor, Preston, United Kingdom

[73] Assignee: British Aerospace, PLC, London, United Kingdom

[21] Appl. No.: 245,633

[22] Filed: Sep. 16, 1988

[30] Foreign Application Priority Data

Sep. 18, 1987 [GB] United Kingdom ............... 8722021

[51] Int. Cl.⁴ .................. F16B 35/00; F16B 35/02
[52] U.S. Cl. .............................. 411/383; 411/338; 411/395; 403/156
[58] Field of Search ........................... 411/383–385, 411/338, 339, 395, 379–382, 192, 195, 271; 403/156, 162, 408.1

[56] References Cited

U.S. PATENT DOCUMENTS

| 611,976 | 10/1898 | Ratchford | 411/195 |
| 644,548 | 2/1900 | Ferris | 411/195 |
| 3,352,343 | 11/1967 | Stitt | 411/271 |
| 3,467,422 | 9/1969 | Mielke | 403/156 |
| 4,102,036 | 7/1978 | Salter | 29/525 |
| 4,786,202 | 11/1988 | Arnold et al. | 403/156 |

Primary Examiner—Neill R. Wilson
Attorney, Agent, or Firm—Kerkam, Stowell, Kondracki & Clarke

[57] ABSTRACT

A lock nut assembly comprises a sleeve bolt (1), a clamp bolt (6) and a locking bolt (7). The sleeve bolt (1) has a hollow shank with an internally threaded portion (5) at one end and a head (3) having an axial bore (2) extending through it at the other end, at which it is internally threaded (4). The clamp bolt (6) also has a hollow shank with an externally threaded central portion (9) and an internally threaded portion (10) at one end (10) and a head (8) at its opposite end. The locking bolt (7) has an externally threaded portion at one end (12) and a head (11) at its opposite end. The central portion (9) of the clamp bolt (6) and the internally threaded portion (5) of the sleeve bolt (1) are dimensioned for co-operation with threads of one hand, and the second portion (10) of the clamp bolt (6) and the externally threaded portion (12) of the locking bolt (7) are dimensioned for co-operation with threads of opposite hand. In use, the clamp bolt (6) is screwed into the sleeve bolt (1), the locking bolt (7) is screwed into the clamp bolt (6) via the hollow shank of the sleeve bolt (1) and, because of the opposite handedness of the respective co-operating threads, the assembly will resist any tendency to undo. Further, components between the heads (3, 11) of the sleeve bolt (1) and clamp bolt (7) will be retained there with a substantially constant predetermined torque.

6 Claims, 4 Drawing Sheets

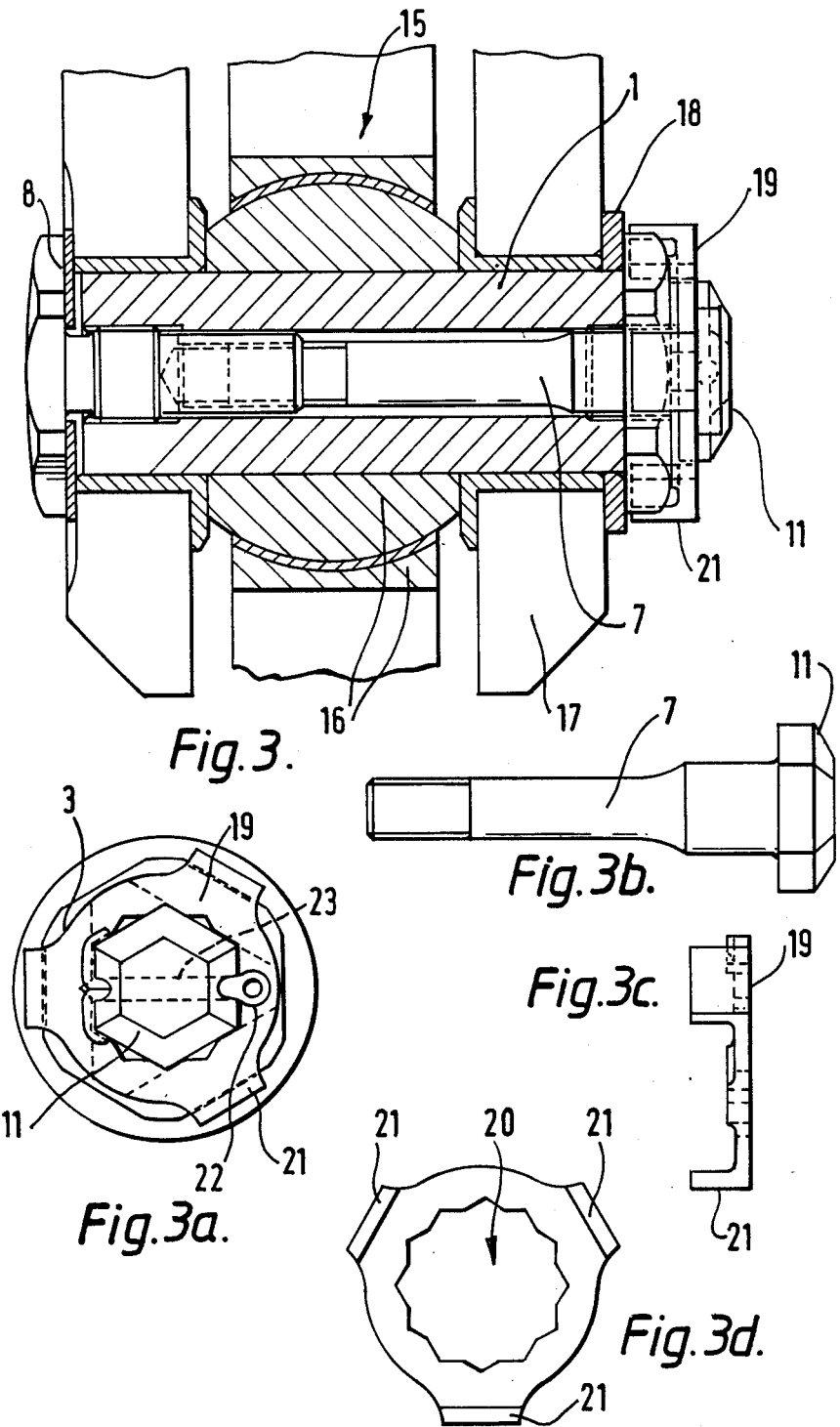

LOCK NUT ASSEMBLIES

This invention relates to lock nut assemblies and in particular to lock nut assemblies for use in applications such as aircraft actuators.

Until now lock nut assemblies have usually comprised a castellated nut used in conjunction with a bolt and a split pin. The bolt has a radially extending hole through its threaded end so that when the nut has been tightened on the bolt to the required torque a split pin may be passed through the hole and one of the gaps between the castellations aligns with the hole to prevent subsequent rotation of the nut.

The main problem with the split pin arrangement is that the strength and reliability of the lock nut assembly is dependent on the shear strength of the split pin. If for any reason the split pin should shear the nut may unscrew from the end of the bolt and cause parts which were previously fastened together to fall apart. Another disadvantage is that during assembly, when the nut has been tightened to the required torque, the gaps of the castellations do not always align exactly with the hole in the bolt and the nut must then either be over-tightened or slackened off until alignment is achieved to and allow the split pin to be inserted. This is unsatisfactory particularly if it results in a large torque error with respect to the desired torque. A method of overcoming this problem is to assemble the bolt through the parts to be joined, tighten the nut on the bolt to the required torque and then drill in situ a hole through the nut, which need not be castellated. The split pin may then be inserted. However, even this solution is not always satisfactory, especially in aircraft where space is very limited and parts are difficult to reach to drill through accurately. Even if the nut and bolt can be drilled through accurately in situ the resulting swarf can fall into inaccessible places inside the aircraft where it can cause damage if it is not removed. Even when fitted, the split pin and castellated nut will always suffer from a small amount of backlash, except in the instance where the hole is drilled in situ.

Another problem common to castellated nuts is that they have a large profile and/or diameter and if they are installed on moving parts, such as mechanical linkages, within an aircraft, the edges of the nut and bolt protrude and may sometimes catch against or cut other internal parts of the aircraft.

It is an object of the present invention to provide a lock nut assembly which overcomes the problems of the conventional castellated nut and which has a smaller, flatter profile. Furthermore it is an object of this invention to provide a lock nut assembly which can be accurately pre-set to the required torque and which can be locked into place without backlash and without the need to drill holes in situ.

According to the present invention a lock nut assembly comprises a sleeve bolt, a clamp bolt and a locking bolt in which the sleeve bolt has a hollow shank with an internally threaded portion at one end and a head portion having an axial bore extending therethrough communicating with the hollow portion at its opposite end, the clamp bolt also has a hollow shank with a first, externally threaded, portion and a second, internally threaded portion at one end and a head portion at its opposite end, and the locking bolt has an externally threaded portion at one end and a head portion at its opposite end, and wherein the first portion of the shank of the clamp bolt and the internally threaded portion of the shank of the sleeve bolt are dimensioned for co-operation with threads of one hand, and the second portion of the shank of the clamp bolt and the externally threaded portion of the locking bolt are dimensioned for co-operation with threads of opposite hand, so that in use the clamp bolt may be screwed into the sleeve bolt, the locking bolt screwed into the clamp bolt via the hollow shank of the sleeve bolt and, because of the opposite handedness of the respective co-operating threads, the assembly will resist any tendency to undo and further, any components retained between the head portions of the sleeve bolt and clamp bolt will be so retained with a substantially constant predetermined torque.

Preferably, the head portions of the sleeve, clamp and locking bolt are multi-facetted head portions to facilitate tightening by spanner or the like.

Preferably, the head portion of the locking bolt is wired to or otherwise secured to the sleeve bolt after tightening further to resist any tendency for the assembly to undo.

Specific embodiments of the invention will now be described by way of example only and with reference to the accompanying drawings of which:

Figure 1:
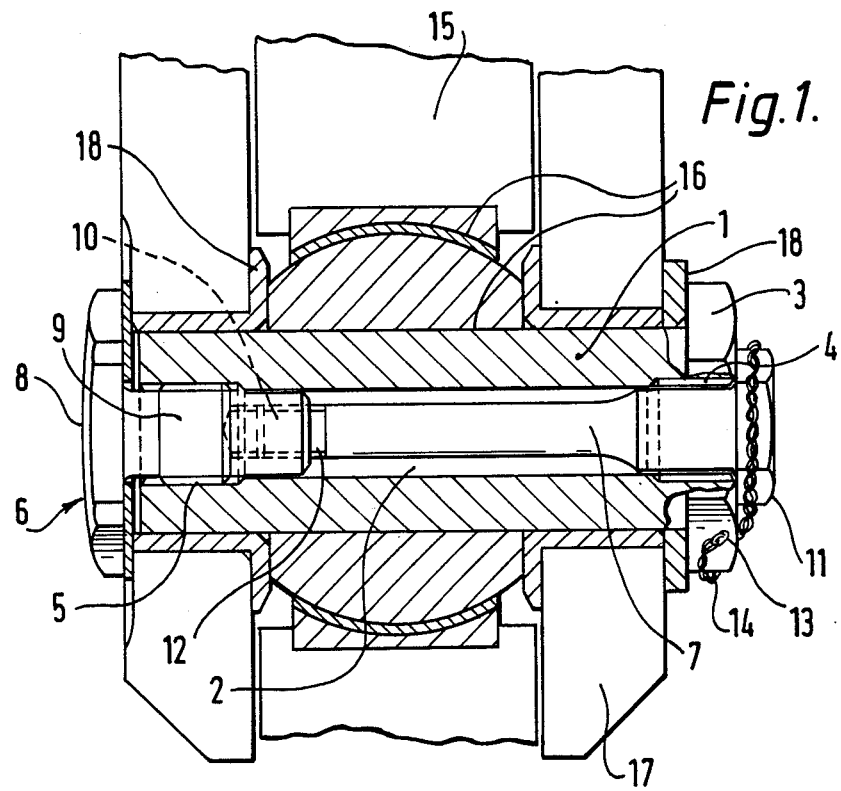
FIG. 1 is a cross-sectional view through a lock nut assembly according to a first embodiment of the present invention.
Figure 1A:
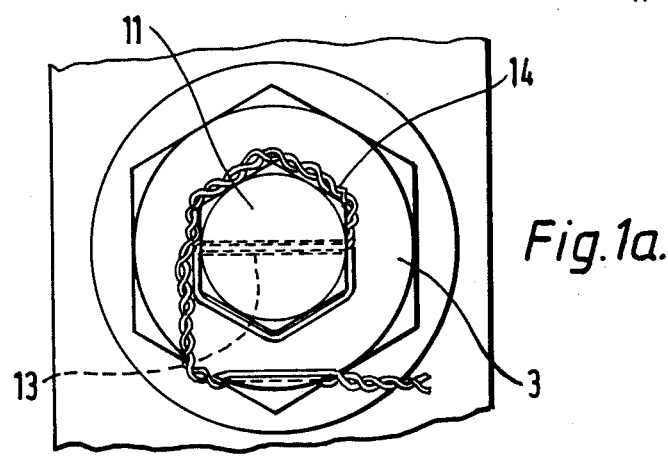
FIG. 1a is a plan view of the assembly of FIG. 1.
Figure 1B:
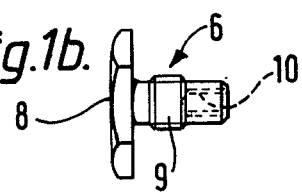
Figure 1C:
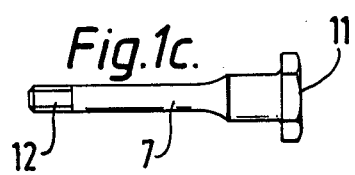
Figure 2:
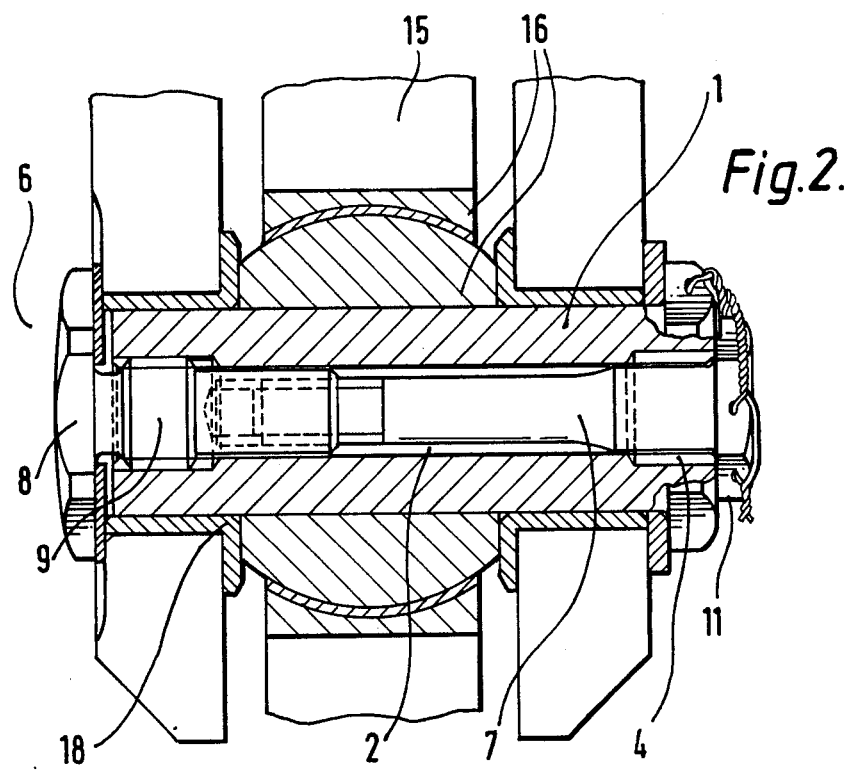
Figure 2A:
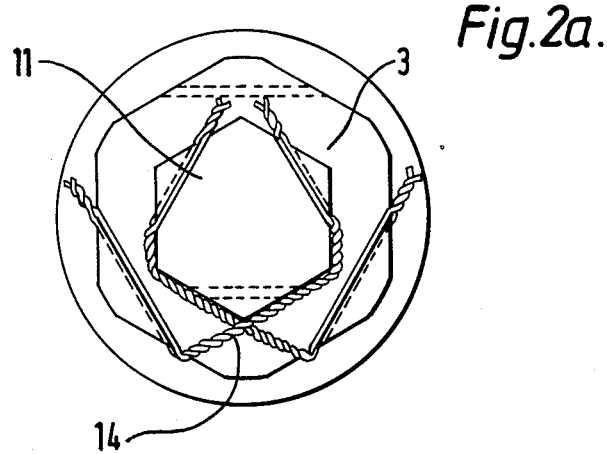
Figure 4:
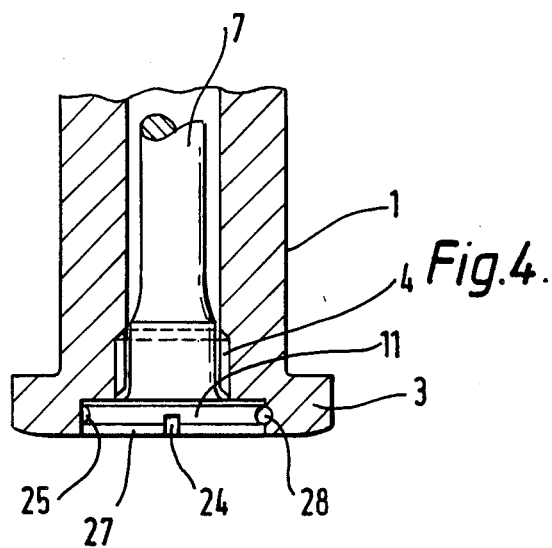
Figure 4A:
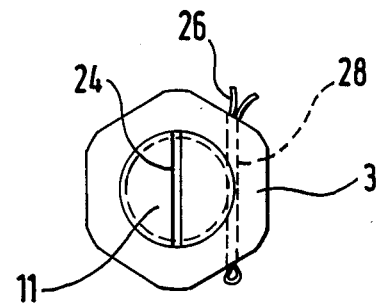

FIGS. 1b and 1c respectively illustrate components of the assembly of FIG. 1, in elevation and on a reduced scale;

FIGS. 2 and 2a respectively correspond to FIGS. 1 and 1a but illustrate an alternative embodiment of the invention;

FIGS. 3 and 3a respectively correspond to FIGS. 1 and 1a but illustrate another preferred embodiment of the invention, with FIGS. 3b to 3d respectively illustrating components of the assembly of FIG. 3, in elevation; and FIGS. 4 and 4a are views through a further embodiment of the present invention, respectively corresponding to FIGS. 1 and 1a.

FIGS. 1 to 1d show a lock nut assembly comprising a hollow sleeve bolt 1 which has an axially extending bore 2 through it. The bolt 1 has a hexagonal head portion 3 with a central aperture aligned with the bore 2 and an adjacent internally threaded portion 4 at one end. An internally threaded portion 5 is provided at the opposite end of the bolt 1.

The locking mechanism for the bolt 1 comprises a clamp bolt 6 and a locking bolt 7; the shanks of both these bolts 6, 7 may be passed through the bore 2 of sleeve bolt 1. The clamp bolt 6 (FIG. 1b) has a low profile torque-adjusting hexagonal head portion 8, an externally threaded central portion 9 and an internally threaded end portion 10 remote from the head portion 8.

The locking bolt 7 (FIG. 1c) has a hexagonal head 11 at one end and an externally threaded portion 12 at the other end. Threaded portions 9 and 12 of the clamp bolt 6 and the locking bolt 7 respectively, are of opposite thread to each other. Similarly, the threaded portion 5 of sleeve bolt 1 and the threaded portion 10 of clamp bolt 6, respectively are of opposite thread to each other. The head portion 11 of the locking bolt 7 has a small transverse bore 13 through which a retaining wire 14 may be passed, see FIG. 1a.

The whole lock nut assembly is shown in situ through a portion of aircraft linkage. The linkage comprises a central portion 15 which is rotatably mounted on bearing surfaces 16 about the circumference of the sleeve bolt 1. A yoked portion 17 of the linkage is attached to the ends of the sleeved bolt 1 by means of bushings 18. During assembly of the linkage the central portion 15 is placed between yoked portion 17 until the bearing 16 is coaxially aligned with the bushings 18. The sleeve bolt 1 is then inserted through the bushings 18 and bearing 16, thereby pinning the linkage together when the sleeve bolt 1 is in place. The sleeve bolt 1 is inserted into the bearing 16 by using an insertion tool (not shown) which is screwed into the threaded portion 4 of the sleeve bolt 1 and is used to draw the sleeve bolt 1 into the bearing 16. The same tool can be used for extracting the sleeve bolt 1 from the bearing 16 during later maintenance or replacement of the bearing parts. The threaded portion 4 of the sleeve bolt 1 is used solely for insertion and extraction of the sleeve bolt 1 and does not in any way co-operate with the shank of the locking bolt 7. The threaded portion 9 of the clamp bolt 6 is screwed into the threaded portion 5 in the end of the sleeve bolt 1 by means of the torque-adjusting head portion 8.

Torque spanners of the appropriate sizes are then placed on each of the head portions 3 and 8 and the clamp bolt 6 is tightened to the required torque. The two hexagonal head portions 3 and 8 constrain the sleeve bolt 1 in the yoked portion 17 of the linkage. When the clamp bolt 6 has been tightened to the required torque the locking bolt 7 is placed through the aperture of the hexagonal head portion 3 and into the bore 2 of the sleeve bolt 1 and the external threaded portion 12 of locking bolt 7 is screwed tightly into the internal threaded portion 10 of the clamp bolt 6 by means of the hexagonal head portion 11. When the locking bolt 7 has been tightened, the hexagonal head portion 8 of bolt 6 cannot accidentally rotate undone (slacken) under the influence of vibration or successive movements of the linkage. Any tendency of the clamp bolt 6 to rotate in an unlocking direction will be resisted by virtue of the opposite handedness of the threaded portions 9 and 5. Should the clamp bolt 6 be subjected to forces which tend to rotate it so as to unscrew co-operating threaded portions 9 and 5, the tendency will be resisted by the interengagement of the oppositely threaded portion 10 of the clamp bolt 6 and the co-operating thread 12 of the locking bolt 7.

The lock nut assembly described is much stronger than conventional castellated nut and split pin arrangements because, unlike the split pin of such known arrangements, the bolt 7 embodied in this invention is not subjected to shear forces. The threaded portions 10 and 12 effectively eliminate the need for a castellated nut with the added advantages that:

(i) the threads allow a continuous range of torque to be applied to the bolt, and (ii) all backlash is substantially eliminated when the lock nut is tightened, unlike the conventional castellated nut which is limited to a series of discrete settings available from the castellations.

Because a large portion of the clamp bolt 6 protrudes inside the sleeve bolt 1 the head portion 8 can be made very thin to fit fairly closely against the surface of the yoke portion 17 of the linkage. In a conventional arrangement the castellated nut would protrude from the yoked portion 17 to a much greater extent and the threaded portion of the corresponding bolt would protrude externally of the yoke with the castellated nut separately bolted on, unlike the present invention, and will cause problems of snagging and abrasion.

As an additional safety measure a locking wire 14 is used to fasten the head 11 of the locking bolt 7 to the bolt head 3 of the sleeve bolt 1. The wire is threaded through the bore 13 of the head 11 of bolt 7 and is tied around the two bolt heads 11 and 3, as shown in the plan view of FIG. 1a. The wire 14 further prevents any tendency of the locking bolt 11 to undo and retains the locking bolt 7 inside the sleeve bolt 1.

FIGS. 2 and 2a, FIGS. 3 to 3d and FIGS. 4 and 4a, respectively, show alternative arrangements for retaining the locking bolt 7 to the sleeve bolt 1. In all other respects the embodiments remain the same as that shown in FIG. 1 as does the basis of its operation and the same reference numbers designate the same or functionally equivalent parts.

If only a single wire 14 is used there is always a chance that during assembly the wire might be fastened the wrong way around the bolt heads in which case the locking bolt 7 will not be constrained by the sleeve bolt 1. For instance, when the locking bolt 7 is subjected to forces which urge it to rotate undone, instead of becoming taut and constraining the locking bolt head 3 the locking wire 14 will become slack and will no longer constrain the locking bolt 1.

To overcome this problem the embodiment of FIGS. 2 and 2a is provided, wherein a set of two wires 14 is used to tie bolt head 11 to bolt head 3. The two wires are tied in opposite directions and this ensures that the bolt 1 cannot be accidentally wired the wrong way round.

FIGS. 3 and 3a to 3d show another arrangement for retaining the locking bolt 7. In this embodiment, the head portion 11 of the locking bolt 7 is chamfered and a broached retaining washer 19 is placed over the top of both the bolt heads 11 and 3. The broached retaining washer 19 has a dodecahedral hole 20 through its middle which fits over the head of the bolt 11 and the side of the retaining washer 19 has three tabs 21 which fit over the sides of the hexagonal head 3 of sleeve bolt 1 and prevent rotation of the locking bolt 7 with respect to the sleeve bolt 1. The broached retaining washer 19 is itself retained by a split pin 22 which is placed through a bore 23 in the hexagonal headed portion 11 of the locking bolt 7. The broached retaining washer 19 prevents the split pin 22 from being subjected to any shear loads because it prevents rotation of the locking bolt 7 with respect to the sleeve bolt 1. The split pin 22 only serves to retain the broached retaining washer 19 in position and is not subjected to any forces at all. A drawback with this arrangement, however, is that it has the same limitations as a conventional castellated nut arrangement and can only be tightened through a series of discrete settings and not through a continuous range.

FIGS. 4 and 4a show an alternative embodiment for fixing a split pin into the end of the sleeve bolt 1 which achieves a very low profile. The head portion 11 of the locking bolt 7 is of cheese head form with a diametral slot 24 for co-operation with a screwdriver. The head also has a circumferential groove 25 machined around its edge with which a split pin 26 co-operates. When the locking bolt 7 is tightened into the clamp bolt 6 the head portion 11 of the locking bolt 7 is countersunk into the head 3 of the sleeve bolt 1 inside a cylindrical recess 27 in head 3. Split pin 26 is then placed through a bore 28 in the side of the head portion 3 so that it engages with the groove 25 in the edge of the cheese head 11 to retain the locking bolt 7 in the sleeve bolt 1. The split pin 26 prevents axial movement of the locking bolt 7 within the sleeve bolt 1 and in so doing prevents the locking bolt 7 from rotating undone. The split pin 26 is offset from the centre of the bolt head 11 to reduce shear forces across the split pin 26. This split pin arrangement eliminates the need to use locking wire and enables a tidier flush fitting to be achieved.

Although only a few specific embodiments of the invention have been disclosed other embodiments are possible without departing from the scope of the invention. For example, the invention need not be limited to use with spherical bearings as shown in the Figures but could for example be used with a plain journal, needle bearings or any other type of bearing.

I claim:

1. A lock nut assembly comprising a sleeve bolt, a clamp bolt and a locking bolt, in which the sleeve bolt has a hollow shank with an internally threaded portion at one end and a head portion having an axial bore extending through it at its opposite end, a portion of said opposite end being internally threaded, the clamp bolt also having a hollow shank, said hollow shank including one end with a first, externally threaded, portion and a second, internally threaded portion, and a head portion at its opposite end, and the locking bolt has an externally threaded portion at one end and a head portion at its opposite end, wherein the first portion of the shank of the clamp bolt and the internally threaded portion of the shank of the sleeve bolt are dimensioned for co-operation with threads of one hand, and the second portion of the shank of the clamp bolt and the externally threaded portion of the locking bolt are dimensioned for co-operation with threads of opposite hand, whereby in use the clamp bolt may be screwed into the sleeve bolt the locking bolt may be screwed into the clamp bolt via the hollow shank of the sleeve bolt and, because of the opposite handedness of the respective co-operating threads, the assembly will resist any tendency to undo.

2. An assembly as claimed in claim 1 wherein the head portion of the locking bolt is wired or otherwise secured to the sleeve bolt after tightening.

3. An assembly as claimed in claim 2 wherein the said head portion is wired by two mutually oppositely directed wires.

4. An assembly as claimed in claim 1 wherein said head portion is chamfered and a shaped washer is placed over said head portion as well as over the head portion of the sleeve bolt, said washer being retained by a split fastener.

5. An assembly as claimed in claim 1 wherein the head portion of the locking bolt is of cheese head form and has a bore offset from the center of the head portion for receiving a split pin.

6. A lock nut assembly comprising a bolt for securing parts together in a manner resisting loosening, said bolt including a hollow shank with a threaded portion, an internal bore and a head formed with a central aperture aligned with said internal bore, the said internal bore being provided with means for engagement with co-operating means of a tool that is in use introduced into the bore via said aperture to insert or extract said bolt, said locking means for said shank, said locking means comprising two threaded members which threadedly engage each other and one of which also threadedly engages the said threaded portion of said shank, the arrangement of these threaded engagements being such that any relative rotation between the said threaded portion of said shank and a given one of said threaded members engaged therewith is opposed by the threaded engagement between the said two threaded members.

* * * * *

UNITED STATES PATENT AND TRADEMARK OFFICE
CERTIFICATE OF CORRECTION

PATENT NO. : 4,889,458

DATED : December 26, 1989

INVENTOR(S) : Brian W. Taylor

It is certified that error appears in the above-identified patent and that said Letters Patent is hereby corrected as shown below:

Column 6, line 30 - delete "said" (first occurrence) and substitute therefor -- and --

Signed and Sealed this

Fifteenth Day of January, 1991

*Attest:*

HARRY F. MANBECK, JR.

*Attesting Officer*  *Commissioner of Patents and Trademarks*